(12) United States Patent
Kato et al.

(10) Patent No.: US 11,379,704 B2
(45) Date of Patent: Jul. 5, 2022

(54) WIRELESS COMMUNICATION DEVICE

(71) Applicant: Murata Manufacturing Co., Ltd., Nagaokakyo (JP)

(72) Inventors: Noboru Kato, Nagaokakyo (JP); Hirokazu Yazaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/143,461

(22) Filed: Jan. 7, 2021

(65) Prior Publication Data

US 2021/0125017 A1    Apr. 29, 2021

Related U.S. Application Data

(63) Continuation of application No. PCT/JP2019/012097, filed on Mar. 22, 2019.

(30) Foreign Application Priority Data

Aug. 9, 2018  (JP) .............................. JP2018-150446

(51) Int. Cl.
*G06K 19/077* (2006.01)
*G06K 19/07* (2006.01)

(52) U.S. Cl.
CPC ..... *G06K 19/0772* (2013.01); *G06K 19/0701* (2013.01); *G06K 19/07773* (2013.01)

(58) Field of Classification Search
CPC ........... G06K 19/0772; G06K 19/0701; G06K 19/07773; G06K 19/07786; H01Q 9/26; H01Q 1/2225
See application file for complete search history.

(56) References Cited

U.S. PATENT DOCUMENTS

| 2006/0145928 A1* | 7/2006 | Lee ........................ H01Q 5/371 343/700 MS |
| 2007/0132593 A1 | 6/2007 | Yamazaki |
| 2010/0134291 A1 | 6/2010 | Lavedas |

FOREIGN PATENT DOCUMENTS

| JP | 2006338563 A | 12/2006 |
| JP | 2007164528 A | 6/2007 |
| JP | 2010136114 A | 6/2010 |
| WO | 2015045614 A1 | 4/2015 |
| WO | 2016043173 A1 | 3/2016 |

OTHER PUBLICATIONS

English machine translation of WO2015/045614 (Year: 2015).*

(Continued)

*Primary Examiner* — Matthew Mikels
(74) *Attorney, Agent, or Firm* — ArentFox Schiff LLP

(57) ABSTRACT

An RFID tag is providing for transmitting and receiving a communication signal. The RFID tag includes a base material, antenna patterns formed on the base material, and an RFIC package connected to the antenna patterns. The antenna patterns are defined by conductor patterns. The whole of the antenna patterns resonate at a communication frequency, and each of the plurality of conductor patterns has a line length that does not cause resonance at a frequency in a microwave band for electromagnetic wave heating higher than the communication frequency.

20 Claims, 10 Drawing Sheets

(56) References Cited

OTHER PUBLICATIONS

Hoffman; "UHF RFID Industry Heat Resistant Tag"; Proceedings of the 12th International Conference "Reliability and Statistics in Transportation and Communication", Oct. 2012, pp. 326-331.
International Search Report issued for PCT/JP2019/012097, dated Apr. 23, 2019.
Written Opinion of the International Searching Authority issued for PCT/JP2019/012097, dated Apr. 23, 2019.

* cited by examiner

WIRELESS COMMUNICATION DEVICE

CROSS REFERENCE TO RELATED APPLICATIONS

The present application is a continuation of PCT/JP2019/012097 filed Mar. 22, 2019, which claims priority to Japanese Patent Application No. 2018-150446, filed Aug. 9, 2018, the entire contents of each of which are incorporated herein by reference.

TECHNICAL FIELD

The present invention relates to a wireless communication device provided with an antenna, and, more particularly, to a wireless communication device, such as an RFID (Radio Frequency Identification) tag, that performs short-range communication using an induced electromagnetic field or an electromagnetic wave.

BACKGROUND

An RFID tag, which is a type of wireless communication device, is used in various situations because it performs communication with a reader/writer to read and write predetermined information in a non-contact manner. For example, attaching RFID tags to all products allows so-called self-checkout to be performed smoothly. Additionally, management of sales and distribution status, such as ensuring traceability and marketing, can be carried out smoothly.

However, a wide variety of products are handled at stores, such as a convenience store and a supermarket, and some of the groceries as products are warmed or heated immediately after the purchase of the product to be taken home or to be eaten or drunk immediately on the spot by the purchaser. For example, a lunch box and a prepared dish may be heated at a store using an electromagnetic wave heating device, such as a microwave oven.

Unfortunately, heating a product with an RFID tag in a microwave oven may cause the following problems.

As the frequency of the communication signal of the RFID tag, the LF band of 135 kHz or less, the HF band of 13.56 MHz or the like, the UHF band of 860 MHz to 960 MHz or the like, and the microwave band of 2.45 GHz or the like are mainly used. Currently, the RFID tag of a type attached to food is an RFID tag that uses the UHF band. In the RFID tag that uses the UHF band, a metal material such as an antenna pattern, which is a metal film body, is formed on a base material such as paper or resin together with an RFIC (Radio-Frequency Integrated Circuit) element.

When a product with such an RFID tag is heated in a microwave oven, energy of electromagnetic waves from the microwave oven is absorbed by the RFID tag together with the product. This may cause the RFID tag, or a portion of the product, having the RFID tag attached, to ignite due to one or more the following: discharge at a place in the metal material portion described above, the place having high electric field strength; heat generation and sublimation of the metal material due to overcurrent flowing through the metal material portion; heat generation of base material of the RFID tag; and the like. In particular, a microwave oven installed in a convenience store emits a high-power electromagnetic wave of about 3 kW into its chamber to heat the RFID tag at once immediately after a start of heating, so that it can be said that a risk of the ignition described above increases if conditions are met.

Japanese Patent Unexamined Publication No. 2006-338563 (hereinafter "Patent Literature 1") discloses an exemplary structure of a "flame-retardant" tag that reduces a risk of ignition in an RFID tag.

The "flame-retardant" tag disclosed in Patent Literature 1 includes a base material mounted with an IC chip and an antenna pattern, with the base material being made of a flame-retardant material. Thus, combustion of the base material is prevented. However, the metal material portion formed on the base material has a high possibility of temporally continuous discharge, so that the structure cannot reliably prevent a risk of ignition of the base material and a possibility that the product catches fire.

SUMMARY OF THE INVENTION

Accordingly, it is an object of the present invention to provide a wireless communication device constructed to prevent ignition and combustion even when it is attached to food or the like and receives high-frequency electric power for heating the food.

Thus, in an exemplary aspect, a wireless communication device is provided that transmits and receives a communication signal. The wireless communication device includes a base material, an antenna pattern formed on the base material, and a power feeding circuit connected to the antenna pattern. The antenna pattern is defined by a plurality of conductor patterns, with the plurality of conductor patterns each having a line length that does not cause resonance at a frequency in a microwave band for electromagnetic wave heating higher than a frequency of the communication signal.

The above structure does not cause the antenna pattern to resonate at the frequency of the microwave for electromagnetic wave heating, so that the antenna pattern does not generate heat due to an induced electric current. Additionally, no large potential difference is generated between the plurality of conductor patterns, so that there is no discharge between the conductor patterns. Thus, the antenna pattern and the base material do not ignite, so that melting or deformation of the wireless communication device, or a portion of a product, having the wireless communication device attached, is prevented.

According to the exemplary embodiments of the present invention, a wireless communication device is constructed to prevent ignition and combustion even when it is attached to food or the like and receives high-frequency electric power for heating the food.

DETAILED DESCRIPTION OF EMBODIMENTS

Figure 1:
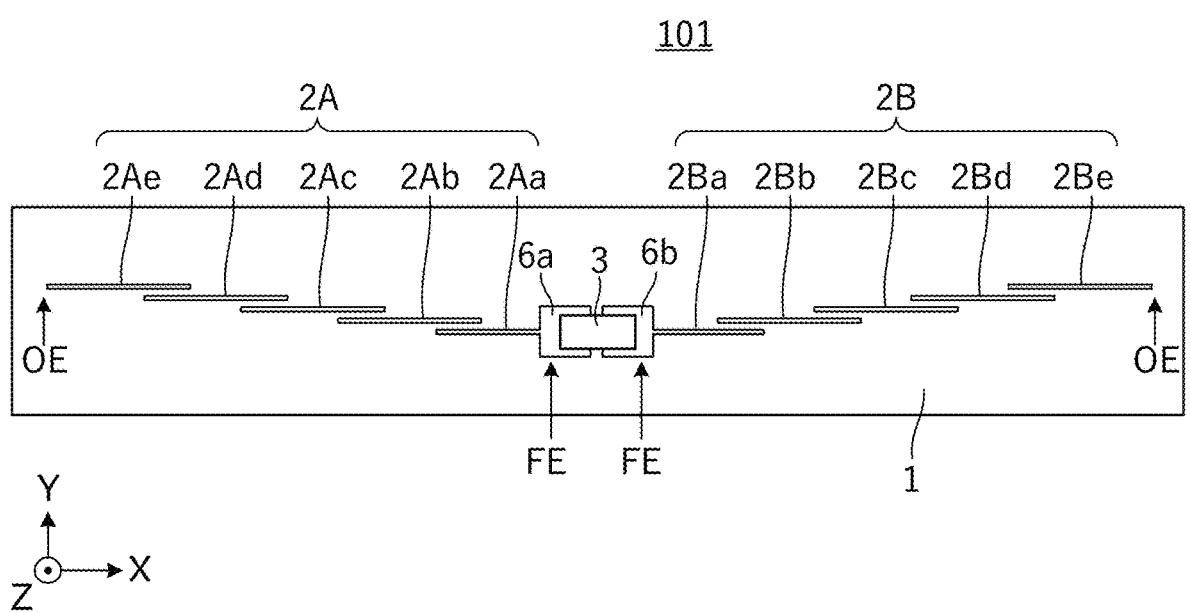
FIG. 1 is a plan view of an RFID tag 101 according to a first exemplary embodiment.

First, structure of various exemplary aspects of a wireless communication device according to the present disclosure will be described.

A wireless communication device of a first exemplary aspect is provided that transmits and receives a communication signal. The wireless communication device includes a base material, an antenna pattern formed on the base material, and a power feeding circuit connected to the antenna pattern. The antenna pattern is defined by a plurality of conductor patterns, and each of the plurality of conductor patterns has a line length that does not cause resonance at a frequency in a microwave band for electromagnetic wave heating higher than a frequency of the communication signal.

When the wireless communication device of the first aspect configured as described above is irradiated with microwaves in a chamber of a microwave oven, for example, each part of the wireless communication device is heated by microwaves. However, the antenna pattern does not resonate at a frequency of the microwaves for electromagnetic wave heating, so that the antenna pattern does not generate heat due to an induced electric current. Additionally, no large potential difference is generated between the plurality of conductor patterns, so that discharge between the conductor patterns is less likely to occur. Thus, the antenna pattern and the base material do not ignite, so that melting or deformation of the wireless communication device, or a portion of a product, having the wireless communication device attached, is prevented.

In the wireless communication device of a second exemplary aspect, a capacitance component is formed between the conductor patterns adjacent to each other among the plurality of conductor patterns, and an inductance component and the capacitance component of the plurality of conductor patterns define an LC series resonant circuit that resonates at the frequency of the communication signal.

The wireless communication device of the second aspect configured as described above allows the LC series resonant circuit to act as a lumped constant resonant circuit that resonates at the frequency of the communication signal, so that a gain at a target frequency can be easily increased.

In the wireless communication device of a third exemplary aspect, a frequency of the communication signal is in a UHF band, and a frequency of the microwave band for electromagnetic wave heating is 2.4 GHz or more and 2.5 GHz or less.

The wireless communication device of the third aspect configured as described above can avoid the above problem with a combination of a general microwave oven using, for example, 2.45 GHz and a general RFID tag using, for example, the UHF band of 860 MHz to 960 MHz.

Convenience stores and supermarkets, where products with wireless communication devices attached are sold, handle a wide variety of products, such as food and convenience goods. In recent years, various experiments have been conducted on convenience stores for practical application of an "unmanned" convenience store that automates payment on purchased products and bagging thereof.

To automate product payment in an "unmanned" convenience store, attaching RFID tags, which are wireless communication devices, to all products is considered. The "unmanned" convenience store has a system in which when a shopping cart containing products with RFID tags attached is placed on a checkout counter, information from the RFID tags is read and purchase prices are displayed. Then, a purchaser can complete the purchase at the "unmanned" convenience store by inserting cash as the purchase prices into a cash slot or inserting a credit card to complete payment, and receiving the products that are automatically packed in a shopping bag.

Hereinafter, exemplary embodiments as specific examples of the wireless communication device according to the present invention will be described with reference to the accompanying drawings. Examples of a product with the wireless communication device according to the present invention attached include all products handled at retail stores, such as convenience stores and supermarkets.

Although an electromagnetic wave heating device described in the following embodiments will be described as a microwave oven that performs dielectric heating, the electromagnetic wave heating device in the present invention is a heating device having a function of performing dielectric heating. Additionally, an RFID tag attached to the above product will be described as an example of the wireless communication device in the following embodiments.

First Exemplary Embodiment

FIG. 1 is a plan view of an RFID tag 101 according to a first exemplary embodiment.

As illustrated in FIG. 1, the RFID tag 101 includes a base material 1 of an insulator or a dielectric, antenna patterns 2A and 2B formed on the base material 1, and an RFIC package 3 connected to the antenna patterns 2A and 2B.

The first antenna pattern 2A is composed of a plurality of conductor patterns 2Aa, 2Ab, 2Ac, 2Ad, and 2Ae. Similarly, the second antenna pattern 2B is composed of a plurality of conductor patterns 2Ba, 2Bb, 2Bc, 2Bd, and 2Be.

The conductor patterns 2Aa, 2Ab, 2Ac, 2Ad, and 2Ae are sequentially arranged from a first land pattern 6a mounted with the RFIC package 3 to a tip OE, while being partially close to each other. Specifically, when a power feeding end FE of the first antenna pattern 2A is defined as a first end of the conductor pattern 2Aa, a second end of the conductor pattern 2Aa is close to a first end of the conductor pattern 2Ab, and the conductor pattern 2Aa and the conductor pattern 2Ab are disposed parallel to each other. The conductor pattern 2Ab has a second end close to a first end of the conductor pattern 2Ac, and the conductor pattern 2Ab and the conductor pattern 2Ac are disposed parallel to each other. Similarly, the conductor pattern 2Ac has a second end close to a first end of the conductor pattern 2Ad, and the conductor pattern 2Ac and the conductor pattern 2Ad are disposed parallel to each other. The conductor pattern 2Ad has a second end close to a first end of the conductor pattern 2Ae, and the conductor pattern 2Ad and the conductor pattern 2Ae are disposed parallel to each other. Thus, each of the respective conductor patterns are generally disposed to be parallel to one another.

Figure 10A:
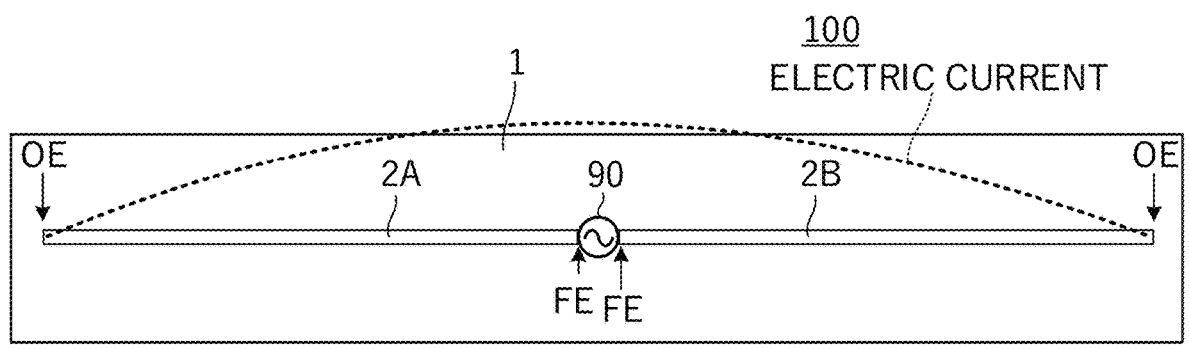
FIGS. 10A and 10B are each a diagram illustrating structure of an RFID tag as a comparative example of the RFID tag according to the first embodiment, and a resonance mode and electric current distribution generated in the RFID tag.
Figure 10B:
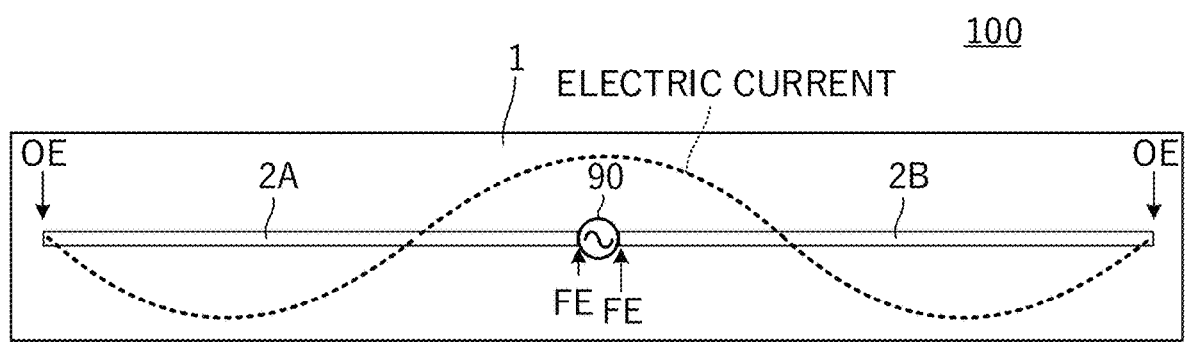

Here, an RFID tag as a comparative example will be described with reference to FIGS. 10A and 10B. FIGS. 10A and 10B each illustrate an RFID tag 100 as a comparative example, including a base material 1 of an insulator or a dielectric, antenna patterns 2A and 2B formed on the base material 1, and a power feeding circuit 90. The antenna patterns 2A and 2B are extended from the power feeding circuit 90 in directions opposite to each other. The antenna patterns 2A and 2B form a dipole-type electric field antenna in which the power feeding circuit 90 is connected to power feeding ends FE.

FIG. 10A illustrates a waveform of electric current density that shows distribution of the electric current density in fundamental wave resonance in which a standing wave having a ¼ wavelength is generated in each of the first antenna pattern 2A and the second antenna pattern 2B. The RFID tag 100 thus resonates with the fundamental wave at the frequency of the communication signal.

In contrast, FIG. 10B illustrates a waveform of electric current density that shows distribution of the electric current density in harmonic resonance in which a standing wave having a ¾ wavelength is generated in each of the first antenna pattern 2A and the second antenna pattern 2B. As described above, when the antenna patterns 2A and 2B are each a long and continuous linear pattern, it can have a higher-order resonance mode. Thus, the RFID tag 100 can resonate with a harmonic in this way at the frequency of the microwaves for electromagnetic wave heating. Moreover, the harmonic resonance mode has a larger number of nodes in the electric current density distribution (because a wave number of resonance increases) as compared to the fundamental resonance mode of ¼ wavelength resonance as illustrated in FIG. 10A, so that a Q value of a resonator increases. Increase of the Q value causes energy to be concentrated, so that heat is likely to be more generated locally.

As described above, resonance at the frequency of the microwaves for electromagnetic wave heating induces a large electric current in the antenna patterns 2A and 2B to cause the antenna patterns 2A and 2B and the base material 1 to generate heat. This effect results in the risk of ignition of the base material 1 and the possibility that the product catches fire.

Figure 2A:
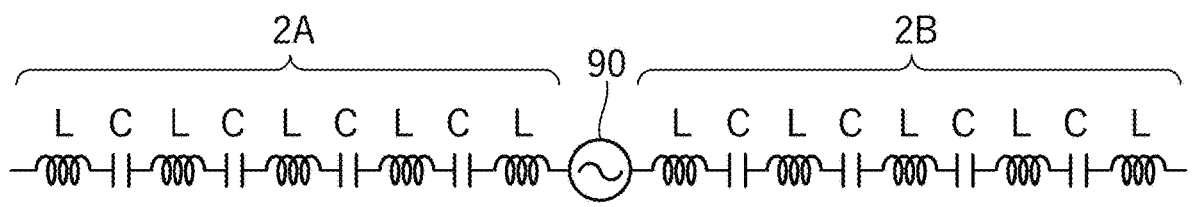
FIG. 2A is an equivalent circuit diagram of antenna patterns 2A and 2B formed on the RFID tag 101 illustrated in FIG. 1.

FIG. 2A is an equivalent circuit diagram of the antenna patterns 2A and 2B formed on the RFID tag 101 illustrated in FIG. 1. FIG. 2A shows inductors L that represent inductance components of the conductor patterns 2Aa, 2Ab, 2Ac, 2Ad, 2Ae, 2Ba, 2Bb, 2Bc, 2Bd, and 2Be as inductors of a lumped constant type. Capacitors C represent capacitance components generated between conductor patterns adjacent to each other, among the conductor patterns 2Aa, 2Ab, 2Ac, 2Ad, 2Ae, 2Ba, 2Bb, 2Bc, 2Bd, and 2Be, as capacitors of a lumped constant type. FIG. 2A illustrates the power feeding circuit 90 that corresponds to the RFIC package 3.

The plurality of conductor patterns 2Aa, 2Ab, 2Ac, 2Ad, 2Ae, 2Ba, 2Bb, 2Bc, 2Bd, and 2Be includes adjacent conductor patterns that are coupled to each other to form an electric field coupling through the corresponding capacitance components. The plurality of conductor patterns 2Aa, 2Ab, 2Ac, 2Ad, 2Ae, 2Ba, 2Bb, 2Bc, 2Bd, and 2Be includes the adjacent conductor patterns that are partially close and parallel to each other, so that the adjacent conductor patterns are also coupled to each other through a magnetic field. Thus, the inductors L also include inductance components due to this magnetic field coupling.

Figure 2B:
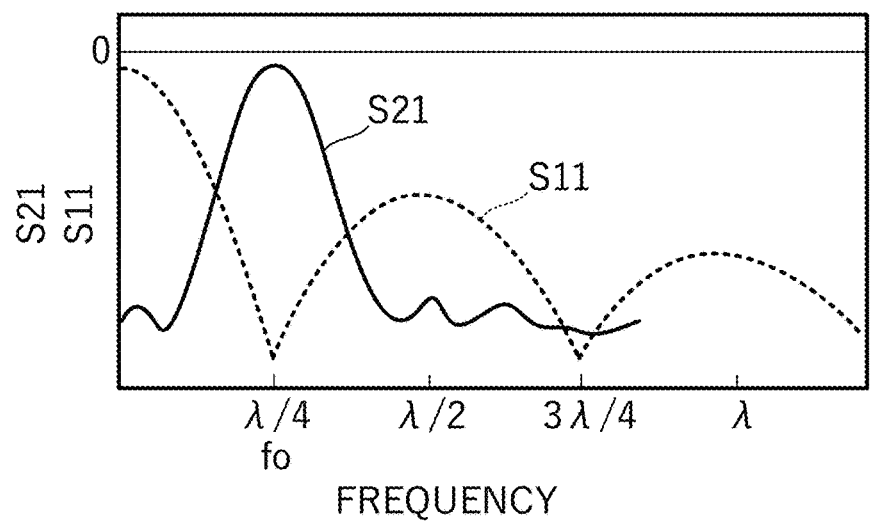
FIG. 2B is a conceptual diagram illustrating frequency characteristics of the antenna patterns 2A and 2B.

FIG. 2B is a conceptual diagram illustrating frequency characteristics of the antenna patterns 2A and 2B. FIG. 2B shows "S21" that is insertion loss when the antenna patterns 2A and 2B are viewed from the power feeding circuit 90. Additionally, "S11" is reflection loss when the antenna patterns 2A and 2B are viewed from the power feeding circuit 90. This reflection loss is, however, viewed from the power feeding circuit 90 of the RFID tag 100 illustrated in FIGS. 10A and 10B as a comparative example.

As illustrated in FIG. 2A, the antenna patterns 2A and 2B provided on the RFID tag 101 of the present embodiment form an LC series resonant circuit. This LC series resonant circuit shows bandpass filter characteristics as illustrated by "S21" in FIG. 2B.

As illustrated in FIG. 2B, a resonance frequency fo of the LC series resonant circuit corresponds to the center frequency of a pass band of the bandpass filter. This resonance frequency fo also corresponds to the center frequency of a frequency band of the communication signal. Here, the frequency band of the communication signal has a frequency of, for example, 860 MHz to 960 MHz of the UHF band. In contrast, the microwave band for electromagnetic wave heating has a frequency of, for example, 2.4 GHz or more and 2.5 GHz or less. As described above, the frequency of the microwave band for electromagnetic wave heating is different from the frequency of the communication signal, so that the LC series resonance circuit does not resonate in the microwave band for electromagnetic wave heating. In other words, the LC series resonant circuit is a lumped constant resonant circuit that resonates at the frequency of the communication signal.

Each of the plurality of conductor patterns 2Aa, 2Ab, 2Ac, 2Ad, 2Ae, 2Ba, 2Bb, 2Bc, 2Bd, and 2Be has a line length that does not cause resonance at the frequency of the microwave band for electromagnetic wave heating. In other words, each conductor pattern has a line length shorter than ½ of the wavelength in the frequency of the microwave band for electromagnetic wave heating, and does not resonate in either a basic mode or a higher-order mode in the microwave band for electromagnetic wave heating. That is, each conductor pattern does not resonate at the frequency of the microwave band for electromagnetic wave heating in terms of distributed constant. Thus, the plurality of conductor patterns 2Aa, 2Ab, 2Ac, 2Ad, 2Ae, 2Ba, 2Bb, 2Bc, 2Bd, and 2Be does not individually resonate at the frequency of the microwave band for electromagnetic wave heating.

The RFID tag 101 of the present embodiment includes a flexible film material or a flame-retardant film material that is used as the base material 1. The base material 1 has an outer shape that is rectangular in a plan view thereof. When the base material 1 is a normal film material that is not flame-retardant, the base material 1 may have a thickness of 38 μm or less. As a result, before burning, the base material 1 melts and deforms, such that the shape of the base material is not maintained.

When a flame-retardant film is used for the base material 1, examples of the flame-retardant film material used include a film obtained by adding a halogen-based flame-retardant material or coating a flame-retardant coating material to a resin material such as PET (polyethylene terephthalate) resin or PPS (polyphenylene sulfide) resin. As a material of the base material 1, a resin material having high functions in terms of heat resistance, hydrolysis resistance, and chemical resistance, such as PEN (polyethylene naphthalate) resin having heat resistance, is available. The base material 1 does not necessarily need a flame-retardant material, and may be made of, for example, a paper material.

The antenna patterns 2A and 2B are each formed on a surface of the base material 1 and made of a film body of a conductive material such as aluminum foil or copper foil, for example.

Figure 3:
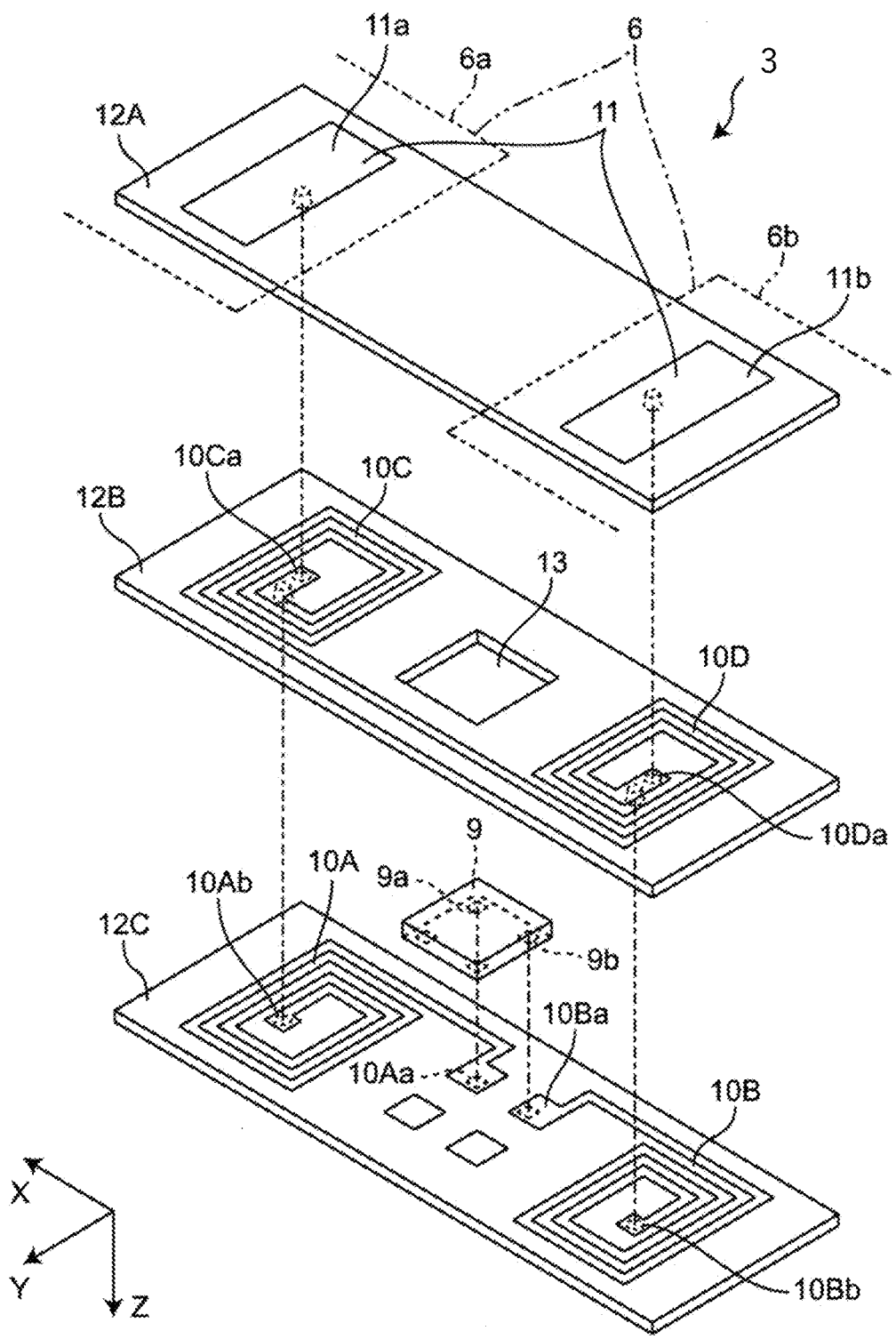
FIG. 3 is an exploded perspective view illustrating structure of an RFIC package 3 mounted on land patterns 6 (6a, 6b) of the antenna patterns 2A and 2B.

FIG. 3 is an exploded perspective view illustrating structure of the RFIC package 3 mounted on the land patterns 6 (6a, 6b) of the antenna patterns 2A and 2B. As illustrated in FIG. 3, the RFIC package 3 in the first embodiment is composed of a multilayer substrate including three layers. Specifically, the multilayer substrate of the RFIC package 3 is made of a resin material such as polyimide or liquid crystal polymer, and includes three flexible insulating sheets 12A, 12B, and 12C that are laminated. The insulating sheets 12A, 12B, and 12C each have a substantially quadrangular shape in a plan view thereof, and have a substantially rectangular shape in the present embodiment. The RFIC package 3 illustrated in FIG. 3 shows a state in which the RFIC package 3 illustrated in FIG. 1 is turned upside down and the three layers are disassembled.

As illustrated in FIG. 3, the RFIC package 3 includes an RFIC chip 9, a plurality of inductance elements 10A, 10B, 10C, and 10D, and external connection terminals 11 (11a, 11b) connected to the antenna patterns 2A and 2B, which are formed at desired positions on a three-layer substrate (the insulating sheets 12A, 12B, and 12C).

The external connection terminals 11a and 11b are formed on the first insulating sheet 12A that is the lowermost layer (i.e., the substrate facing the antenna patterns 2A and 2B), and are formed at positions facing the land patterns 6a and 6b of the antenna patterns 2A and 2B, respectively. The four inductance elements 10A, 10B, 10C, and 10D are formed separately, two by two, on the second insulating sheet 12B and the third insulating sheet 12C. That is, the first inductance element 10A and the second inductance element 10B are formed on the third insulating sheet 12C that is the uppermost layer (i.e., the layer illustrated at the bottom in FIG. 3), and the third inductance element 10C and the fourth inductance element 10D are formed on the second insulating sheet 12B that is an intermediate layer.

The RFIC package 3 of the present embodiment includes the external connection terminals 11a and 11b, and the four inductance elements 10A, 10B, 10C, and 10D, which are each composed of a conductor pattern made of a conductive material, such as aluminum foil or copper foil, for example.

As illustrated in FIG. 3, the RFIC chip 9 is mounted on the third insulating sheet 12C, which is the uppermost layer, in a central portion in a longitudinal direction (i.e., X direction in FIG. 3). The RFIC chip 9 has a structure in which an RF circuit is formed on a semiconductor substrate made of a semiconductor such as silicon. The first inductance element 10A formed in a spiral shape on one side in the longitudinal direction (i.e., the side in +X direction in FIG. 3) on the third insulating sheet 12C is connected to one input-output terminal 9a of the RFIC chip 9 via a land 10Aa. The second inductance element 10B formed in a spiral shape on the other side in the longitudinal direction (i.e., the side in -X direction in FIG. 3) on the third insulating sheet 12C is connected to the other input-output terminal 9b of the RFIC chip 9 via a land 10Ba.

The third inductance element 10C in a spiral shape is formed on one side in the longitudinal direction (i.e., the side in +X direction in FIG. 3) on the second insulating sheet 12B, which is an intermediate layer, and the fourth inductance element 10D in a spiral shape is formed on the other side in the longitudinal direction (i.e., the side in -X direction in FIG. 3) on the second insulating sheet 12B. The third inductance element 10C in a spiral shape has an outer peripheral end that is directly connected to an outer peripheral end of the fourth inductance element 10D in a spiral shape. In contrast, the third inductance element 10C has a land 10Ca, which is an inner peripheral end thereof and connected to a land 10Ab being an inner peripheral end of the first inductance element 10A in a spiral shape formed on the third insulating sheet 12C via an interlayer connection conductor such as a via conductor passing through the second insulating sheet 12B. The land 10Ca being the inner peripheral end of the third inductance element 10C is connected to the first external connection terminal 11a on the first insulating sheet 12A via an interlayer connection conductor such as a through-hole conductor passing through the first insulating sheet 12A being the lowermost layer.

The fourth inductance element 10D has a land 10Da, which is an inner peripheral end thereof and connected to a land 10Bb being an inner peripheral end of the second inductance element 10B in a spiral shape formed on the third insulating sheet 12C via an interlayer connection conductor such as a through-hole conductor passing through the second insulating sheet 12B. The land 10Da being the inner peripheral end of the fourth inductance element 10D is connected to the second external connection terminal 11b on the first insulating sheet 12A via an interlayer connection conductor such as a through-hole conductor passing through the first insulating sheet 12A being the lowermost layer.

The first external connection terminal 11a on the first insulating sheet 12A is disposed so as to be connected to the first land pattern 6a of the first antenna pattern 2A formed on the base material 1. The second external connection terminal 11b on the first insulating sheet 12A is disposed so as to be connected to the second land pattern 6b of the second antenna pattern 2B formed on the base material 1.

As further shown, the second insulating sheet 12B being an intermediate layer is formed with a through hole 13 in which the RFIC chip 9 mounted on the third insulating sheet 12C is housed. The RFIC chip 9 is disposed between the first inductance element 10A and the second inductance element 10B, and between the third inductance element 10C and the fourth inductance element 10D. Thus, the RFIC chip 9 is configured to function as a shield, and magnetic field coupling and electric field coupling between the first inductance element 10A and the second inductance element 10B are suppressed. Similarly, the magnetic field coupling and the electric field coupling between the third inductance element 10C and the fourth inductance element 10D are suppressed. As a result, in the RFIC Package 3, the narrowing of a pass band of the communication signal is suppressed, and the pass band is widened.

Although the present embodiment shows an example in which the RFIC package 3 is mounted on the antenna patterns 2A and 2B, the RFIC chip 9 may be mounted directly on the antenna patterns 2A and 2B. At this time, the inductors formed as the plurality of inductance elements 10A, 10B, 10C, and 10D in the RFIC package 3 can be formed on the base material 1 using a loop-shaped pattern, for example.

Figure 4:
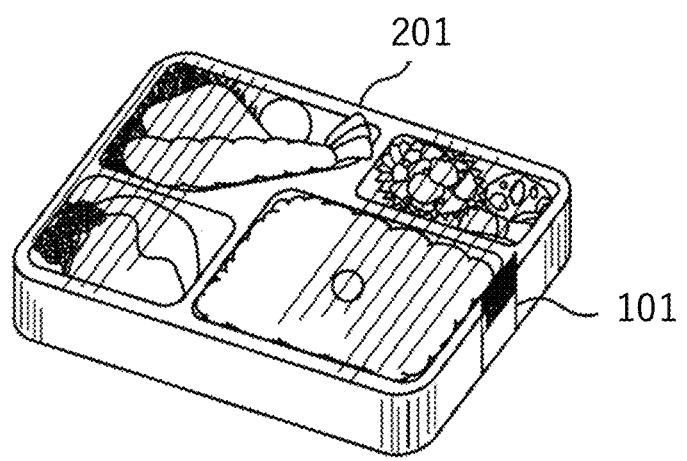
FIG. 4 is a diagram illustrating an example of a product with an RFID tag attached, and is a perspective view of a lunch box 201 with an RFID tag 101 attached.

FIG. 4 is a diagram illustrating an example of a product with an RFID tag attached, and is a perspective view of a lunch box 201 with the RFID tag 101 attached.

Even when the lunch box 201 with the RFID tag 101 attached, as described above, is heated in a microwave oven, ignition of the RFID tag 101, and melting or deformation of a wrapping film of the lunch box with the RFID tag 101 attached, can be prevented.

Second Exemplary Embodiment

A second embodiment shows some examples each having an RFID tag with an antenna pattern that is different in shape from the antenna pattern of the RFID tag shown in the first embodiment.

Figure 5:
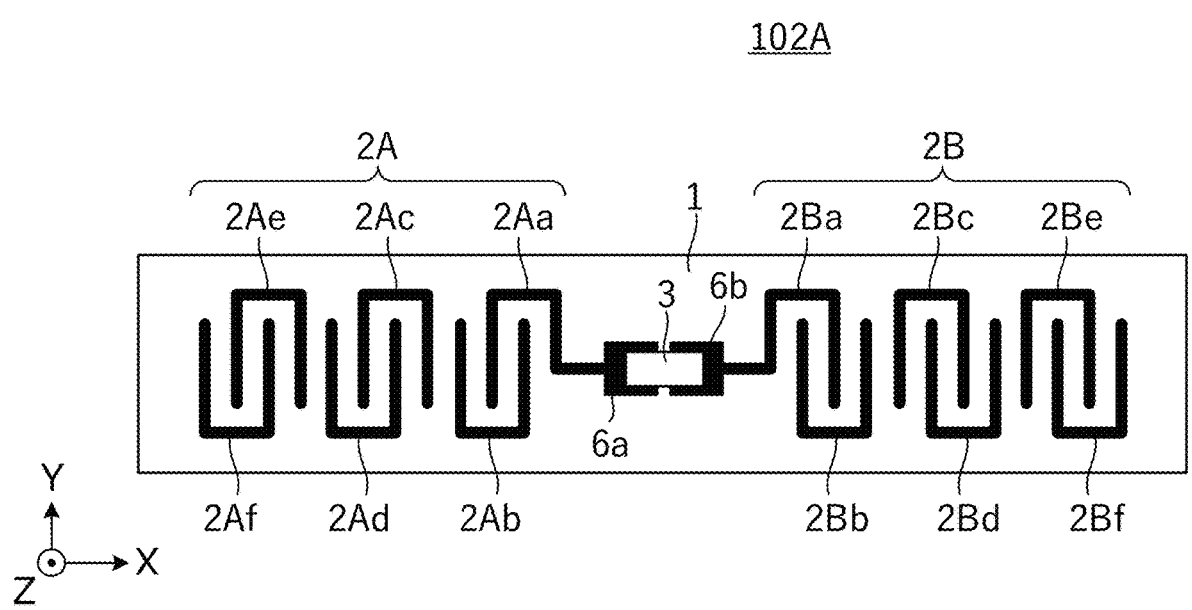
FIG. 5 is a plan view of an RFID tag 102A according to a second exemplary embodiment.

FIG. 5 is a plan view of an RFID tag 102A according to the second exemplary embodiment.

As illustrated in FIG. 5, the RFID tag 102A includes a base material 1 of an insulator or a dielectric, antenna patterns 2A and 2B formed on the base material 1, and an RFIC package 3 connected to the antenna patterns 2A and 2B. The first antenna pattern 2A is composed of a plurality of conductor patterns 2Aa, 2Ab, 2Ac, 2Ad, 2Ae, and 2Af. Similarly, the second antenna pattern 2B is composed of a plurality of conductor patterns 2Ba, 2Bb, 2Bc, 2Bd, 2Be, and 2Bf.

The conductor patterns 2Aa, 2Ab, 2Ac, 2Ad, 2Ae, and 2Af are sequentially arranged from a first land pattern 6a mounted with the RFIC package 3 toward one end (i.e., in the −X direction in FIG. 5) in a longitudinal direction of the base material 1, while being partially close to each other. The conductor patterns 2Aa, 2Ab, 2Ac, 2Ad, 2Ae, and 2Af are each in a U-shape facing +Y direction or −Y direction, and two conductor patterns adjacent to each other are paired. The two conductor patterns are disposed such that one conductor pattern has a half inserted inside the other conductor pattern in a U-shape, and the other conductor pattern has a half inserted inside the one conductor pattern in a U-shape. FIG. 5 illustrates an example in which the pair of conductor patterns 2Aa and 2Ab, the pair of conductor patterns 2Ac and 2Ad, and the pair of conductor patterns 2Ae and 2Af, are arranged. Then, the conductor pattern 2Aa has one end connected to the first land pattern 6a mounted with the RFIC package 3. Thus, the conductor patterns 2Aa, 2Ab, 2Ac, 2Ad, 2Ae, and 2Af include the conductor patterns that are adjacent to each other forming in close portions thereof electric field coupling, or magnetic field coupling along with the electric field coupling.

The conductor patterns 2Ba, 2Bb, 2Bc, 2Bd, 2Be, and 2Bf forming the second antenna pattern 2B are sequentially arranged from a second land pattern 6b mounted with the RFIC package 3 toward one end (i.e., in the +X direction in FIG. 5) in the longitudinal direction of the base material 1, while being partially close to each other. The second antenna pattern 2B is symmetrical in shape to the first antenna pattern 2A, and the conductor patterns 2Ba, 2Bb, 2Bc, 2Bd, 2Be, and 2Bf are symmetrical in shape to the conductor patterns 2Aa, 2Ab, 2Ac, 2Ad, 2Ae, and 2Af. Thus, the conductor patterns 2Ba, 2Bb, 2Bc, 2Bd, 2Be, and 2Bf include the conductor patterns that are adjacent to each other forming in close portions thereof electric field coupling, or magnetic field coupling along with the electric field coupling.

Figure 6:
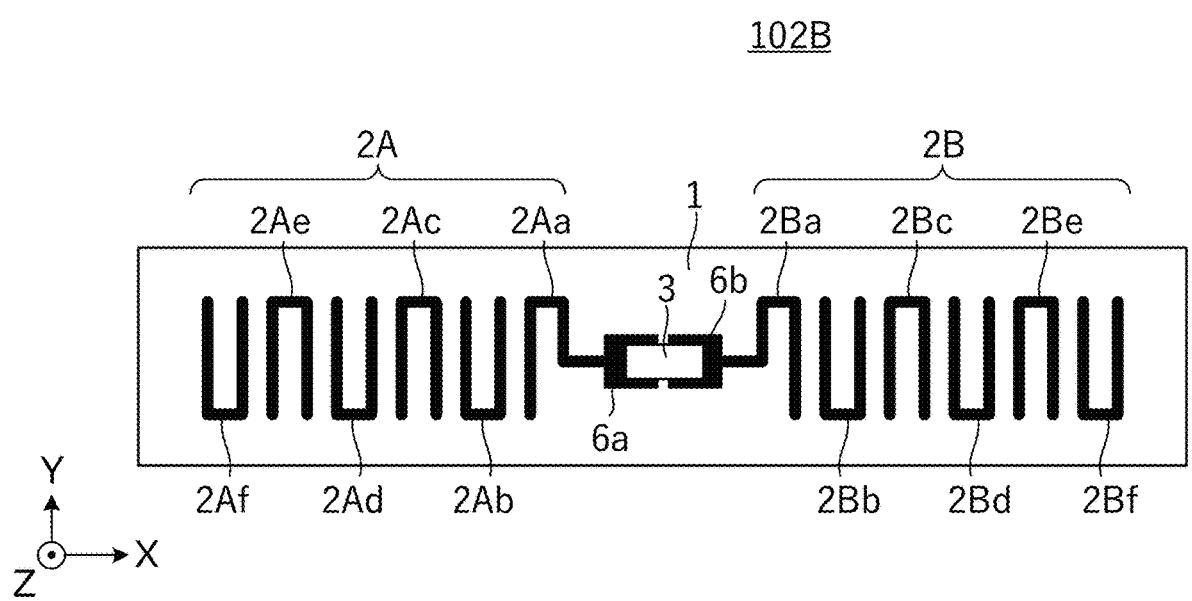
FIG. 6 is a plan view of an RFID tag 102B according to the second exemplary embodiment.

FIG. 6 is a plan view of an RFID tag 102B according to a refinement of the second embodiment. The RFID tag 102B includes a base material 1 of an insulator or a dielectric, antenna patterns 2A and 2B formed on the base material 1, and an RFIC package 3 connected to the antenna patterns 2A and 2B. The first antenna pattern 2A is composed of a plurality of conductor patterns 2Aa, 2Ab, 2Ac, 2Ad, 2Ae, and 2Af. Similarly, the second antenna pattern 2B is composed of a plurality of conductor patterns 2Ba, 2Bb, 2Bc, 2Bd, 2Be, and 2Bf.

The conductor patterns 2Aa, 2Ab, 2Ac, 2Ad, 2Ae, and 2Af are sequentially arranged from a first land pattern 6a mounted with the RFIC package 3 toward one end (i.e., in the −X direction in FIG. 6) in a longitudinal direction of the base material 1, while being partially close to each other. The conductor patterns 2Aa, 2Ab, 2Ac, 2Ad, 2Ae, and 2Af are each in a U-shape (e.g., a hairpin shape) facing +Y direction or −Y direction, and are arranged such that the adjacent conductor patterns have the U-shapes with openings facing directions opposite to each other. Then, the conductor pattern 2Aa has one end connected to the first land pattern 6a mounted with the RFIC package 3.

The conductor patterns 2Aa, 2Ab, 2Ac, 2Ad, 2Ae, and 2Af form a pattern like a bandpass filter in which a plurality of hairpin resonators is sequentially magnetically coupled (e.g., interdigital coupling). Thus, the conductor patterns 2Aa, 2Ab, 2Ac, 2Ad, 2Ae, and 2Af include the conductor patterns that are adjacent to each other forming electric field coupling, or magnetic field coupling along with the electric field coupling.

The conductor patterns 2Ba, 2Bb, 2Bc, 2Bd, 2Be, and 2Bf forming the second antenna pattern 2B are sequentially arranged from a second land pattern 6b mounted with the RFIC package 3 toward one end (i.e., in the +X direction in FIG. 6) in the longitudinal direction of the base material 1, while being partially close to each other. The second antenna pattern 2B is symmetrical in shape to the first antenna pattern 2A, and the conductor patterns 2Ba, 2Bb, 2Bc, 2Bd, 2Be, and 2Bf are symmetrical in shape to the conductor patterns 2Aa, 2Ab, 2Ac, 2Ad, 2Ae, and 2Af. Thus, the conductor patterns 2Ba, 2Bb, 2Bc, 2Bd, 2Be, and 2Bf include the conductor patterns that are adjacent to each other forming in close portions thereof electric field coupling, or magnetic field coupling along with the electric field coupling.

Each of conductor patterns, in a U-shape (e.g., hairpin shape), may be formed facing one direction (i.e., the +Y direction or −Y direction) to form a structure that is apparently comb-line type coupling.

Figure 7:
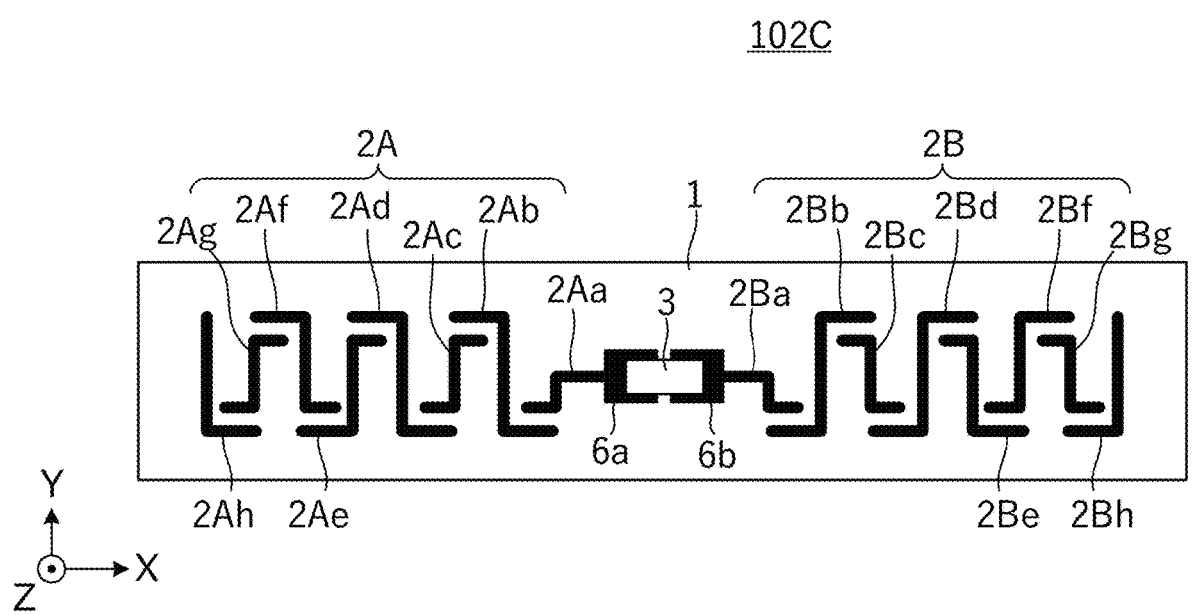
FIG. 7 is a plan view of an RFID tag 102C according to the second exemplary embodiment.

FIG. 7 is a plan view of an RFID tag 102C according to another refinement of the second embodiment. The RFID tag 102C includes a base material 1 of an insulator or a dielectric, antenna patterns 2A and 2B formed on the base material 1, and an RFIC package 3 connected to the antenna patterns 2A and 2B. The first antenna pattern 2A is composed of a plurality of conductor patterns 2Aa, 2Ab, 2Ac, 2Ad, 2Ae, 2Af, 2Ag, and 2Ah. Similarly, the second antenna pattern 2B is composed of a plurality of conductor patterns 2Ba, 2Bb, 2Bc, 2Bd, 2Be, 2Bf, 2Bg, and 2Bh.

The conductor patterns 2Aa, 2Ab, 2Ac, 2Ad, 2Ae, 2Af, 2Ag, and 2Ah are sequentially arranged from a first land pattern 6a mounted with the RFIC package 3 toward one end (i.e., in the −X direction in FIG. 7) in a longitudinal direction of the base material 1, while being partially close to each other. As shown, the conductor patterns 2Aa, 2Ab, 2Ac, 2Ad, 2Ae, 2Af, 2Ag, and 2Ah are each in a crank shape or an L-shape, and are arranged such that vicinities of ends of adjacent conductor patterns are close to each other over a predetermined length. Thus, the conductor patterns 2Aa, 2Ab, 2Ac, 2Ad, 2Ae, 2Af, 2Ag, and 2Ah include the conductor patterns that are adjacent to each other forming in close portions thereof electric field coupling, or magnetic field coupling along with the electric field coupling.

The conductor patterns 2Ba, 2Bb, 2Bc, 2Bd, 2Be, 2Bf, 2Bg, and 2Bh forming the second antenna pattern 2B are sequentially arranged from a second land pattern 6b mounted with the RFIC package 3 toward one end (i.e., in the +X direction in FIG. 7) in the longitudinal direction of the base material 1, while being partially close to each other. The second antenna pattern 2B is symmetrical in shape to the first antenna pattern 2A, and the conductor patterns 2Ba, 2Bb, 2Bc, 2Bd, 2Be, 2Bf, 2Bg, and 2Bh are symmetrical in shape to the conductor patterns 2Aa, 2Ab, 2Ac, 2Ad, 2Ae, 2Af, 2Ag, and 2Ah. Thus, the conductor patterns 2Ba, 2Bb, 2Bc, 2Bd, 2Be, 2Bf, 2Bg, and 2Bh include the conductor patterns that are adjacent to each other forming in close portions thereof electric field coupling, or magnetic field coupling along with the electric field coupling.

Figure 8:
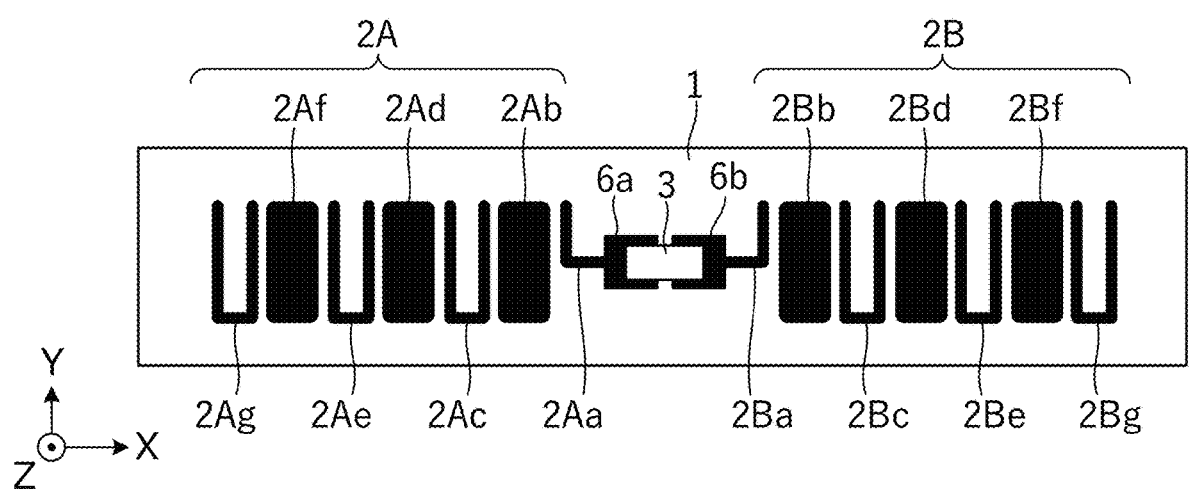
FIG. 8 is a plan view of an RFID tag 102D according to the second exemplary embodiment.

FIG. 8 is a plan view of an RFID tag 102D according to yet another refinement of the second exemplary embodiment. The RFID tag 102D includes a base material 1 of an insulator or a dielectric, antenna patterns 2A and 2B formed on the base material 1, and an RFIC package 3 connected to the antenna patterns 2A and 2B. The first antenna pattern 2A is composed of a plurality of conductor patterns 2Aa, 2Ab, 2Ac, 2Ad, 2Ae, 2Af, and 2Ag. Similarly, the second antenna pattern 2B is composed of a plurality of conductor patterns 2Ba, 2Bb, 2Bc, 2Bd, 2Be, 2Bf, and 2Bg.

The conductor patterns 2Aa, 2Ab, 2Ac, 2Ad, 2Ae, 2Af, and 2Ag are sequentially arranged from a first land pattern 6a mounted with the RFIC package 3 toward one end (i.e. in the −X direction in FIG. 8) in a longitudinal direction of the base material 1, while being partially close to each other. The conductor pattern 2Aa is in an L-shape, and the conductor patterns 2Ac, 2Ae, and 2Ag are each in a U-shape. The conductor patterns 2Ab, 2Ad, and 2Af are each in a rectangular shape spreading in a plane. As shown, the conductor patterns 2Aa, 2Ac, 2Ae, and 2Ag, which are each in a linear shape, and the conductor patterns 2Ab, 2Ad, and 2Af, which are each in a planar shape, are alternately disposed. Then, the conductor pattern 2Aa has one end connected to the first land pattern 6a mounted with the RFIC package 3. Thus, the conductor patterns 2Aa, 2Ab, 2Ac, 2Ad, 2Ae, 2Af, and 2Ag include the conductor patterns that are adjacent to each other forming in close portions thereof electric field coupling, or magnetic field coupling along with the electric field coupling.

The conductor patterns 2Ba, 2Bb, 2Bc, 2Bd, 2Be, 2Bf, and 2Bg forming the second antenna pattern 2B are sequentially arranged from a second land pattern 6b mounted with the RFIC package 3 toward one end (i.e., in the +X direction in FIG. 8) in the longitudinal direction of the base material 1, while being partially close to each other. The second antenna pattern 2B is symmetrical in shape to the first antenna pattern 2A, and the conductor patterns 2Ba, 2Bb, 2Bc, 2Bd, 2Be, 2Bf, and 2Bg are symmetrical in shape to the conductor patterns 2Aa, 2Ab, 2Ac, 2Ad, 2Ae, 2Af, and 2Ag. Thus, the conductor patterns 2Ba, 2Bb, 2Bc, 2Bd, 2Be, 2Bf, and 2Bg include the conductor patterns that are adjacent to each other forming in close portions thereof electric field coupling, or magnetic field coupling along with the electric field coupling.

Figure 9:
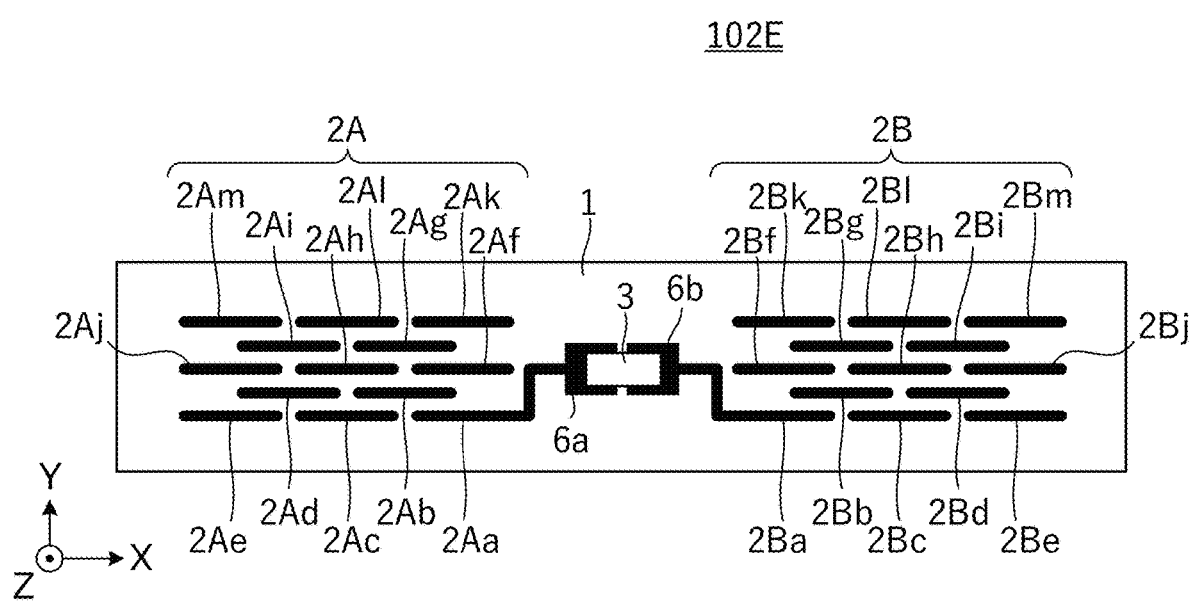
FIG. 9 is a plan view of an RFID tag 102E according to the second exemplary embodiment.

FIG. 9 is a plan view of an RFID tag 102E according to yet another refinement the second exemplary embodiment. The RFID tag 102E includes a base material 1 of an insulator or a dielectric, antenna patterns 2A and 2B formed on the base material 1, and an RFIC package 3 connected to the antenna patterns 2A and 2B. As shown, the first antenna pattern 2A is composed of a plurality of conductor patterns 2Aa to 2Am. Similarly, the second antenna pattern 2B is composed of a plurality of conductor patterns 2Ba to 2Bm.

The conductor patterns 2Aa to 2Am are sequentially arranged from a first land pattern 6a mounted with the RFIC package 3 toward one end (i.e., in the −X direction in FIG. 9) in a longitudinal direction of the base material 1, while being partially close to each other. The conductor patterns 2Aa to 2Am are each in a crank shape or a linear shape (i.e., line-segment shapes), and are arranged such that vicinities of ends of adjacent conductor patterns are close to each other over a predetermined length. The conductor patterns 2Aa to 2Am are each arranged to have a length direction corresponding to an extending direction (i.e., in the −X direction) of the antenna pattern 2A, and a width direction corresponding to a direction (i.e., in the Y direction) orthogonal to the extending direction of the antenna pattern 2A.

The conductor patterns 2Aa to 2Am include the conductor patterns that are adjacent to each other forming in close portions thereof electric field coupling, or magnetic field coupling along with the electric field coupling.

The conductor patterns 2Ba to 2Bm forming the second antenna pattern 2B are sequentially arranged from a second land pattern 6b mounted with the RFIC package 3 toward one end (i.e., in the +X direction in FIG. 9) in the longitudinal direction of the base material 1, while being partially close to each other. The second antenna pattern 2B is symmetrical in shape to the first antenna pattern 2A, and the conductor patterns 2Ba to 2Bm are symmetrical in shape to the conductor patterns 2Aa to 2Am. Thus, the conductor patterns 2Ba to 2Bm include the conductor patterns that are adjacent to each other forming in close portions thereof electric field coupling, or magnetic field coupling along with the electric field coupling.

In general, it is noted that the RFID tags 102A to 102E illustrated in FIGS. 5 to 9 are each configured such that the antenna patterns 2A and 2B form an LC series resonant circuit having characteristics of a bandpass filter, and the communication signal has a frequency corresponding to the center frequency of a passband of the bandpass filter. The LC series resonant circuit is constructed such that it does not resonate in the microwave band for electromagnetic wave heating. Then, each of the plurality of conductor patterns forming the antenna patterns 2A and 2B does not individually resonate at a frequency in the microwave band for electromagnetic wave heating.

Moreover, in an exemplary aspect, the antenna patterns 2A and 2B described above are each made of metal material having high conductivity such as an aluminum electrode or a copper electrode, for example. Besides the metal material, carbon-based material may be used as the antenna patterns 2A and 2B.

Although FIGS. 1 and 5 to 9 each show an example in which the first antenna pattern 2A and the second antenna pattern 2B included in the RFID tag have shapes having a line-symmetrical relationship with respect to a power feeding point (e.g., a position of the RFIC package 3), the two antenna patterns 2A and 2B may have shapes having a point-symmetrical relationship with respect to the power feeding point. Additionally, the shapes may be asymmetric according to alternative embodiments.

As described above using the specific structure in each of the embodiments, ignition of an RFID tag, and melting or deformation of members of a product with the RFID tag attached can be prevented, when the product with the RFID tag attached is heated by an electromagnetic wave heating device. Thus, the present invention provides a wireless communication device configured to construct a system for automating payment and bagging of a purchased product at a store such as a convenience store that handles a wide variety of products such as foods and convenience goods, and that can make a great step toward practical application of an "unmanned" convenience store.

Finally, it is noted that the above description of the exemplary embodiments is illustrative in all respects and not restrictive. Those skilled in the art can appropriately make modifications and alterations.

REFERENCE SIGNS LIST

FE power feeding end
OE tip
1 base material
2A first antenna pattern
2Aa-2Am conductor pattern
2B second antenna pattern
2Ba-2Bm conductor pattern
3 RFIC package
6 land pattern
6a first land pattern
6b second land pattern
9 RFIC chip
9a, 9b input-output terminal
10A first inductance element
10B second inductance element
10C third inductance element
10D fourth inductance element
10Aa, 10Ab, 10Ba, 10Bb, 10Ca, 10Da land
11 external connection terminal
11a first external connection terminal
11b second external connection terminal
12A first insulating sheet
12B second insulating sheet
12C third insulating sheet
13 through hole
90 power feeding circuit
101 RFID tag
102A-102E RFID tag
201 lunch box

The invention claimed is:

1. A wireless communication device for transmitting and receiving a communication signal, the wireless communication device comprising:
a base material;
an antenna pattern disposed on the base material and comprising a plurality of conductor patterns, with adjacent conductor patterns of the plurality of conductor patterns coupled to each other; and
a power feeding circuit connected to the antenna pattern,
wherein the antenna pattern is configured to resonate with a whole of the plurality of conductor patterns at a frequency of the communication signal, and
wherein each of the plurality of conductor patterns has a line length constructed to not resonate at a frequency in a microwave band for electromagnetic wave heating that is higher than the frequency of the communication signal.

2. The wireless communication device according to claim 1, wherein a capacitance component is formed between respective pairs of adjacent conductor patterns of the plurality of conductor patterns.

3. The wireless communication device according to claim 2, wherein an inductance component and the capacitance component of the plurality of conductor patterns define an LC series resonant circuit that resonates at the frequency of the communication signal.

4. The wireless communication device according to claim 1, wherein the frequency of the communication signal is in a UHF band, and the frequency of the microwave band for electromagnetic wave heating is at least 2.4 GHz and at most 2.5 GHz.

5. The wireless communication device according to claim 1, wherein the base material comprises at least one of an insulator and a dielectric.

6. The wireless communication device according to claim 1, wherein the plurality of conductor patterns are sequentially arranged from a first land pattern connected to the power feeding circuit towards an edge of the base material.

7. The wireless communication device according to claim 6, wherein the plurality of conductor patterns are linear patterns disposed in a direction parallel to each other.

8. The wireless communication device according to claim 2, wherein the plurality of conductor patterns are coupled to each other by an electric field coupling through the corresponding capacitance components.

9. The wireless communication device according to claim 1, wherein the base material has an outer shape that is rectangular in a plan view thereof and has a pair of long sides and a pair of short side.

10. The wireless communication device according to claim 9, wherein each of the plurality of conductor patterns comprise a U-shape facing one of the pair of long sides, respectively.

11. The wireless communication device according to claim 10, wherein a pair of the plurality of conductor patterns are disposed such that one conductor pattern of the pair has a half inserted inside the other conductor pattern in the U-shape, and the other conductor pattern of the pair has a half inserted inside the one conductor pattern in the U-shape.

12. The wireless communication device according to claim 10, wherein the plurality of conductor patterns are disposed such that adjacent conductor patterns are positioned with the U-shapes with openings facing directions opposite to each other.

13. The wireless communication device according to claim 9, wherein each of the plurality of conductor patterns has a crank shape or an L-shape and is arranged such that vicinities of respective ends of adjacent conductor patterns face each other over a predetermined length.

14. The wireless communication device according to claim 9, wherein the plurality of conductor patterns include a portion of U-shaped conductor patterns and a portion of rectangular-shaped conductor patterns that are alternately disposed with respect to each other.

15. The wireless communication device according to claim 1, wherein each of the plurality of conductor patterns are either an aluminum electrode or a copper electrode.

16. The wireless communication device according to claim 1, wherein each of the plurality of conductor patterns comprises a carbon-based material.

17. A wireless communication device for transmitting and receiving a communication signal, the wireless communication device comprising:
a base material;
a power feeding circuit coupled to the base material; and
an antenna pattern disposed on the base material coupled to the power feeding circuit,
wherein the antenna pattern comprises a plurality of conductor patterns, with adjacent conductor patterns of the plurality of conductor patterns coupled to each other and with respective pairs of the plurality of conductor patterns coupled to each other by electric field coupling, wherein the antenna pattern is configured to resonate with a whole of the plurality of conductor patterns at a frequency of the communication signal, and wherein each of the plurality of conductor patterns does not resonate at a frequency in a microwave band for electromagnetic wave heating.

18. The wireless communication device according to claim 17, wherein the frequency in the microwave band is higher than the frequency of the communication signal.

19. The wireless communication device according to claim 18, wherein an inductance component and a capacitance component of the plurality of conductor patterns define an LC series resonant circuit that resonates at the frequency of the communication signal.

20. The wireless communication device according to claim 18, wherein the frequency of the communication signal is in a UHF band, and the frequency of the microwave band for electromagnetic wave heating is at least 2.4 GHz and at most 2.5 GHz.

* * * * *